United States Patent [19]

Horvath et al.

[11] 4,269,510

[45] May 26, 1981

[54] SMOKE DETECTOR

[75] Inventors: Zoltan Horvath; Jürg Muggli, both of Männedorf; Hans Ackermann, Stäfa; Erwin Tresch, Männedorf, all of Switzerland

[73] Assignee: Cerberus Ag, Männedorf, Switzerland

[21] Appl. No.: 82,613

[22] Filed: Oct. 9, 1979

[30] Foreign Application Priority Data

Dec. 21, 1978 [CH] Switzerland ....................... 13000/78
Dec. 21, 1978 [CH] Switzerland ....................... 13001/78

[51] Int. Cl.[3] ....................... G01N 21/53; G08B 17/10

[52] U.S. Cl. .................................... 356/338; 250/574; 340/630

[58] Field of Search ................ 356/338, 340; 250/574; 340/628, 630

[56] References Cited

U.S. PATENT DOCUMENTS

| | | | |
|---|---|---|---|
| 3,185,975 | 5/1965 | Kompelien | 356/338 X |
| 4,181,439 | 1/1980 | Tresch et al. | 356/338 |

OTHER PUBLICATIONS

Smith, W. J., *Modern Optical Engineering,* McGraw-Hill, pp. 128-131, New York.

*Primary Examiner*—John K. Corbin
*Assistant Examiner*—Bruce Y. Arnold
*Attorney, Agent, or Firm*—Werner W. Kleeman

[57] ABSTRACT

A smoke detector, especially for a fire alarm, comprising a radiation source possessing a substantially conical ring-shaped radiation characteristic or pattern and a radiation receiver arranged along the axis of the radiation source but externally of the direct radiation. The radiation receiver receives radiation which is scattered by smoke particles within the conical ring-shaped radiation region. In order to reduce the spurious radiation impinging on the radiation receiver the radiation region is bounded by elements located externally of the direct receiving region of the radiation receiver. Web means (which comprise the bounding elements opposite the radiation source) are provided which are specially-shaped to prevent dust from collecting on their radiation receiving surfaces, thereby keeping the smoke detector from becoming increasingly susceptible with time to the triggering of false alarms as the deposition of dust at the inner surface of the fire detector housing increases.

9 Claims, 1 Drawing Figure

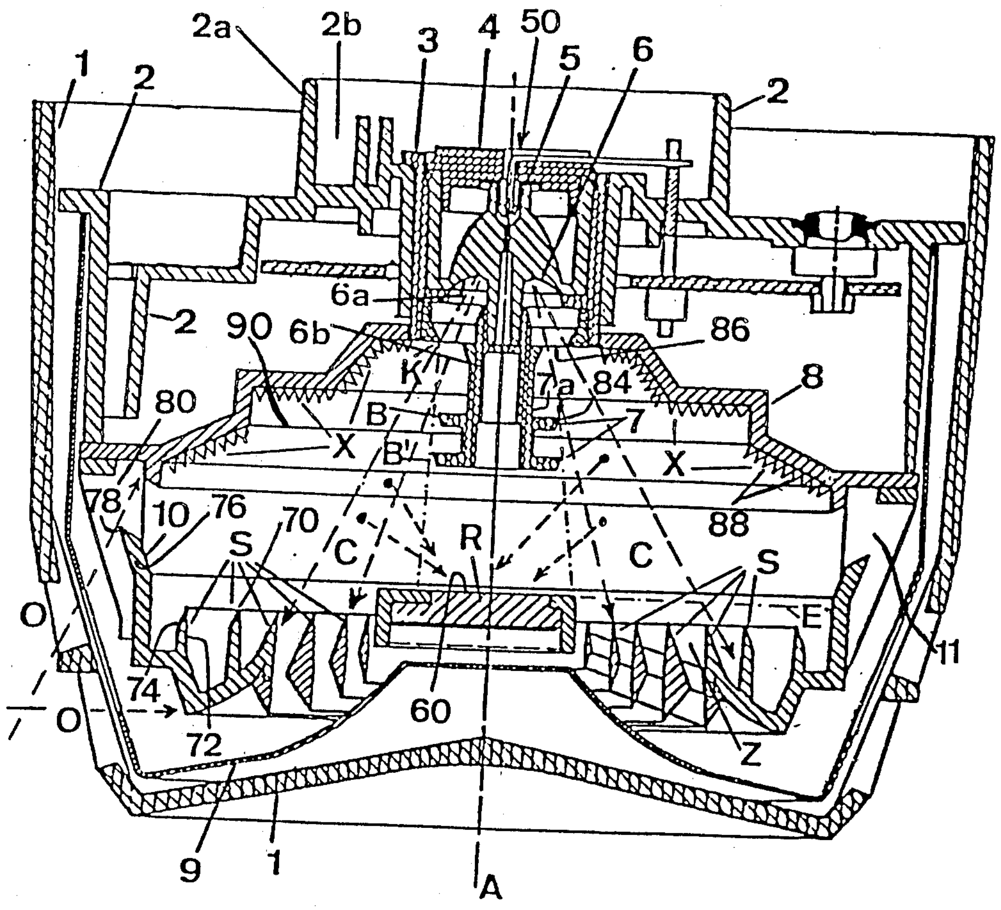
2a
2b
3
4
50
5
6
1
2
2
2
6a
90
6b
86
K
7a
84
8
80
B
7
X
B'
X
88
78
10
76
70
S
C
R
C
S
E
O
11
74
60
O
72
Z
9
1
A

SMOKE DETECTOR

BACKGROUND OF THE INVENTION

The present invention relates to a new and improved construction of optical smoke detector for the detection of a combustion process, specifically for a fire alarm.

The smoke detector of the present development is generally of the type comprising a radiation source which transmits radiation throughout a conical ring-shaped radiation region. A radiation receiver is arranged externally of the direct radiation region in the cone axis and receives radiation which is scattered by particles located in the radiation region. Such smoke detectors are typically used, for instance, for detecting and reporting a fire or the like.

An important problem which exists with such smoke detectors resides in maintaining as low as possible the irradiation of the radiation receiver when there is not present smoke in the radiation region, so that upon the presence of the smallest amount of scattered radiation, caused by smoke particles located in the scattered radiation region, there is produced a signal at the output of the radiation receiver. Such type smoke detector will respond to the smallest smoke concentration and will detect and signal the presence of smoke with increased sensitivity.

In practice, however, there is always present a certain level of spurious or disturbing radiation, preventing the attainment of this objective. Therefore, it is already known in the art to use baffles at the air inlet openings of the smoke detector for screening the spurious radiation which enters the smoke detector from the outside through the housing openings, and thus, reducing the spurious radiation level, but with the drawback that through this technique there is also slowed down the entry of air. A further known technique in this art is to modulate the radiation source and to tune the radiation receiver to the modulated radiation source such that the radiation receiver is preferably only sensitive to radiation whose modulation corresponds to that of the radiation source.

Yet, in the aforementioned manner there cannot be prevented that radiation emanating from the radiation source and scattered at the inner wall of the housing likewise impinges as spurious radiation at the radiation receiver. Such spurious radiation is processed by the receiver in the same manner as radiation which is really scattered at the smoke particles in the radiation region, since it possesses exactly the same modulation. In order to reduce this type of spurious radiation it has become known to the art to structure the inner surface of the housing of the smoke detector so as to be extensively radiation absorbent at least at the impingement locations of the direct radiation at the radiation receiver, for instance to structure such inner surface of the housing so as to be dull black, to provide it with ribs or to construct it as a radiation trap. A typical smoke detector of such type is disclosed in U.S. Pat. No. 3,185,975, which issued May 25, 1965 to Arlon D. Kompelien.

What is disadvantageous with this design of smoke detector is that dust tends to deposit with time upon the radiation absorbing elements, for instance upon the dull black surfaces or the edges of the mounted ribs. This deposited dust or similar contaminants increases the reflection capability and again annihilates the radiation absorbing effect. Such heretofore known smoke detectors therefore become increasingly susceptible with time to triggering false alarms as the deposition of dust at the inner surface of the fire detector housing increases.

SUMMARY OF THE INVENTION

Therefore, with the foregoing in mind it is a primary object of the present invention to provide a new and improved construction of smoke detector which is not afflicted with the aforementioned drawbacks and limitations of the prior art constructions.

Another and more specific object of the present invention aims at providing a new and improved construction of smoke detector which, while avoiding the aforementioned drawbacks of heretofore known smoke detectors, provides a construction possessing a lower sensitivity to spurious radiation and having an increased sensitivity which is maintained throughout a longer period of time and in the presence of increased dust formation, and thus, accordingly operates in a reliable fashion over a longer time span without the necessity of cleaning the smoke detector, and wherein nonetheless air containing smoke particles can rapidly enter the smoke detector.

Yet a further significant object of the present invention is concerned with a new and improved construction of smoke detector which is relatively simple in design, extremely reliable in operation, affords early detection of a fire or other combustion process producing smoke or the like, and wherein the effects of spurious radiation and false alarms are minimized.

Now in order to implement these and still further objects of the invention, which will become more readily apparent as the description proceeds, the smoke detector of the present development is manifested by the features that the substantially conical ring-shaped radiation region is limited by elements arranged externally of the direct receiving region of the radiation receiver.

A further advantageous construction of the invention is realized when the directly irradiated elements are designed as webs arranged concentrically with respect to the cone axis and disposed behind the radiation sensitive top or upper surface of the radiation receiver. In this way there is beneficially achieved the result that the scattered radiation, emanating from the webs, first can impinge upon the radiation receiver after it has been deflected a number of times, and thus, correspondingly attenuated. Furthermore, it is advantageous to structure the webs such that their inner surfaces are almost parallel to the cone axis, in other words, are vertically dispositioned, and specifically, are disposed at an angle which is smaller than the radiation cone angle. With this design there is achieved the result that the direct radiation only impinges upon vertical surfaces at which it is not possible for dust to deposit or if dust does deposit thereat then only to a very slight degree. In this way there is further reduced the effect of slow dust deposition or contamination upon the spurious radiation level.

Moreover, it is advantageous to delimit or bound the radiation region by outer and inner diaphragms or equivalent structure, arranged such that their irradiated edges are screened by a further diaphragm from the central radiation receiver. In this way there is obtained the result that the radiation scattered by such edges does not directly strike the radiation receiver.

BRIEF DESCRIPTION OF THE DRAWINGS

The invention will be better understood and objects other than those set forth above, will become apparent when consideration is given to the following detailed description thereof. Such description makes reference to the annexed drawing wherein the single FIGURE shows in sectional view the construction of an exemplary embodiment of smoke detector according to the invention.

DETAILED DESCRIPTION OF THE PREFERRED EMBODIMENTS

Describing now the drawing, the exemplary illustrated embodiment of rotationally symmetrical smoke detector will be seen to comprise an enclosing housing 1 possessing openings O for the entry of air into the interior of the smoke detector. Within the smoke detector housing 1 there is provided a support element 2 whose upper portion *2a*, protruding out of the housing 1, is constructed for the attachment and for the electrical connection of the smoke detector at a not particularly illustrated, but conventional socket.

Inserted into a central bore *2b* of this support element or component 2 is a holder element or component 3 where there is mounted a radiation source, generally indicated by reference character 50.

This radiation source 50 consists of a base portion 4 carrying at its central region a light or infrared radiation emitting diode 5. In the radiation direction, i.e., below this diode 5 there is mounted an optical system or lens means 6, whose optically effective surfaces *6a* are constructed such that the radiation emitted by the diode 5 has a conical ring-shaped radiation characteristic or pattern. Hence, there is basically only present radiation in a conical, ring-shaped radiation region C, whereas, on the other hand, there is practically no radiation present in the direction of the cone axis A.

The residual radiation remaining in the axial direction is additionally screened by a diaphragm or screening element 7 having radiation absorbing surfaces *7a*. Below the radiation source 50 and the diaphragm or screening element 7 there is arranged at the cone axis A a radiation receiver R in a manner such that its radiation receiving surface 60 is directed upwardly, i.e., in the direction of the radiation source 50. Hence, radiation which has been forwardly scattered by smoke particles present in the conical ring-shaped radiation region C impinges upon this radiation receiver R. Moreover, the radiation receiver R is held by the holding or retaining elements 8 and 10 in the correct position and in the proper spacing from the radiation source 50.

Viewed in the radiation direction the radiation region C is closed by a radiation entrapping element or radiation trap 10. This radiation trap 10 comprises a number of concentric webs S having a substantially circular ring-shaped cross-sectional configuration and which are arranged rotationally symmetrical about the cone axis A and enclose the radiation receiver R. The radiation trap 10 is mounted and positioned at the smoke detector in such a manner that the upper edges 70 of the webs S are arranged below the plane E of the radiation receiving surface 60 of the radiation receiver R, or, stated in another way are directed away from such radiation receiving surface 60. With this measure there is achieved the beneficial result that although the direct radiation, impinges upon the upper edges 70 of the webs S, and is scattered to a certain degree at such location, the resultant scattered radiation, with the indicated position of the individual parts relative to one another, cannot however directly impinge upon the radiation receiving surface 60 of the radiation receiver R. Quite to the contrary, radiation striking the upper edges 70 of the webs S first will be scattered a number of times, and thus, will have an appreciably weaker intensity, before it possibly impinges the radiation receiving surface 60 of the radiation receiver R.

In the embodiment under discussion the inner surfaces 72 of the web S constitute cylindrical surfaces arranged about the cone axis A, whereas the outwardly directed surfaces 74 of the webs S are structured, at least at the upper part thereof, to be slightly conical and form an acute angle with respect to the cone axis A. The aperture angle is coordinated to the aperture angle of the cone shell of the radiation region C, and specifically, the angle of inclination of the outer surfaces 74 of the webs S with respect to the cone axis A is advantageously chosen to be somewhat smaller than the aperture angle of the conical ring-shaped radiation region C. In this way there is achieved the result that the direct radiation, emanating from the radiation source R, only impinges upon the vertical inner surfaces 72 of the webs S, not however upon the inclined outer surfaces 74. The advantage of this arrangement particularly resides in the fact that it is practically impossible for dust to deposit upon such vertical inner surfaces 72 of the webs S. The effect is intensified if the intermediate spaces Z between the webs S are at least predominantly open, so that the dust which has penetrated into the smoke detector can further fall down and not settle at all at the region of the webs S.

In order to additionally render possible a rapid penetration of air containing smoke into the interior of the smoke detector, without enabling the entry of spurious light from the outside, it is advantageous to construct the outer edge or rim 76 of the radiation trap or radiation entrapping element 10 such and to arrange the openings O laterally at the housing 1 such that these openings O are covered by the outer edge or rim 76 of the radiation trap 10. The upper end 78 of the outer edge or rim 76 extends into an intermediate space or chamber 80 between the housing 1 and a web 11 provided at the element 8 which constitutes a spacer ring, so that no linear path leads from the openings O into the interior 90 of the smoke detector. In other words, light cannot directly enter from the outside, however inflowing air only will be deflected through an angle of about 90°, and therefore, its entry into the interior 90 of the smoke detector is only slightly hindered. The open intermediate spaces Z between the webs S are beneficially arranged relative to the openings O likewise such that also no linear path extends between the openings O through these intermediate spaces Z into the interior of the detector, but air containing smoke particles has a further possibility of rapidly entering the interior 90 of the detector and reaching the radiation region C or again moving out of such radiation region. In this way there is rendered possible an optimum flow of the air containing the smoke through the smoke detector and there is insured for rapid triggering of an alarm upon the occurrence of smoke in the air.

At the inside of the cone ring the conical ring-shaped radiation region C is bounded by the diaphragm system or diaphragm means 7 composed of a number of substantially circular-shaped diaphragm or screening disks B, B′ and so forth. In order to be able to properly position the diaphragm system 7 in relation to the radiation source 5 there is provided at the optical means 6 a projection 6*b* or equivalent structure upon which there can be mounted the diaphragm system 7. The diameter and the mutual position of the individual diaphragm disks B, B′ and so forth relative to one another is chosen such that one of the forwardmost diaphragms, in the illustrated embodiment therefore the diaphragm B, in other words the diaphragm confronting the radiation source 50, functions as the inner boundary of the radiation region C, i.e., protrudes furthest into such radiation region. In order to prevent that the spurious radiation, scattered at the edge 84 of such diaphragm disk B will impinge upon the radiation receiver R, a further diaphragm, here the diaphragm B′ confronting such radiation receiver R, is structured such that the direct spurious radiation, emanating from the edge 84 of the diaphragm B, will be completely screened from the radiation receiver R.

At its outer surface the radiation region C is limited or bounded by a diaphragm or screen K. This diaphragm K is likewise chosen as concerns its diameter and arranged in relation to the further screening diaphragm B′ such that also the direct spurious radiation, emanating from the inner edge 86 of this diaphragm K, is completely screened from the radiation receiver R by the diaphragm B′.

By virtue of the described measures there is initially achieved the result that all of the parts, delimiting the radiation region C, at which there thus impinges direct radiation, cannot direct, in the first instance, scattered radiation caused by the direct radiation onto the radiation receiver R. All of the elements which delimit the radiation region C, in the illustrated embodiment, the elements or parts K, B and S, thus are located externally of the direct receiving region of the radiation receiver R.

In order to further reduce the spurious radiation level, it is advantageous to construct as radiation absorbent those parts of the smoke detector which enclose the radiation region C and which are situated at the direct receiving region of the radiation receiver R. For instance, the corresponding elements can be provided with ribs X where there occurs a multiple reflection of spurious radiation which arises, and therefore, can only bring about a very weak secondary spurious radiation which could influence the radiation receiver R. These ribs X advantageously can be structured so as to have acute-angled edges 88 having an angle of inclination between 20° and 70°, for instance about 45°, thereby producing an adequate radiation absorption.

In this way the spurious radiation level can be still further lowered and the sensitivity of the smoke detector further increased. In particular when using the smoke detector for a fire alarm there is insured an incipient sounding of the alarm already with low smoke density and there is afforded operational reliability over longer periods of time, even if such smoke detectors are employed in the presence of unfavorable ambient conditions and are exposed to slow dust contamination.

While there are shown and described present preferred embodiments of the invention, it is to be distinctly understood that the invention is not limited thereto, but may be otherwise variously embodied and practiced within the scope of the following claims. Accordingly,

What we claim is:

1. A smoke detector comprising:

a radiation source for transmitting radiation into a substantially conical ring-shaped direct radiation region and having a cone axis;

a radiation receiver arranged externally of the direct radiation region in the cone axis;

said radiation receiver receiving radiation scattered by particles located within the direct radiation region;

means bounding the conical ring-shaped direct radiation region;

said bounding means being arranged externally of a direct receiving region of the radiation receiver;

said bounding means including web means surrounding the radiation receiver at all sides and limiting the radiation region in the radiation direction of the radiation source;

said web means being arranged in a substantially ring-shaped configuration and rotationally symmetrical with respect to the cone axis;

said web means comprising a plurality of adjacently situated spaced webs defining between adjacent webs intermediate spaces;

each of said webs having an inner surface arranged approximately parallel to the cone axis;

each of said webs further having an outer surface which encloses an acute angle with the cone axis; and the angle which the outer surface of each web encloses with the cone axis is smaller than the angle between the direct radiation impinging onto the webs and the cone axis, in order to thereby exclude direct radiation from impinging upon said outer surfaces.

2. The smoke detector as defined in claim 1, wherein:

the predominant part of the intermediate spaces between the webs are open at both ends.

3. The smoke detector as defined in claim 2, further including:

a housing enclosing the radiation source, the radiation receiver and the webs;

said housing having air entry opening means;

wherein the air opening means of the housing relative to the open intermediate spaces between the webs are arranged such that no linear path leads from the opening means into the interior of the smoke detector.

4. The smoke detector as defined in claim 1, wherein:

each of said webs has an outer surface;

there is provided a housing for enclosing the radiation source, the radiation receiver and the web means;

said housing having openings for the entry of air into the interior of said housing; and, there is provided means for mounting said webs such that the outer surfaces of the webs overlie the air entry openings of the housing such that no linear path leads from said openings into the interior of the smoke detector.

5. The smoke detector as defined in claim 4, wherein:

the air entry openings of the housing relative to the intermediate spaces between the webs are arranged such that no linear path leads from the air entry openings into the interior of the smoke detector.

6. The smoke detector as defined in claim 1, further including:

surface means situated opposite said webs; and radiation absorbing rib means provided for the oppositely situated surface means.

7. The smoke detector as defined in claim 1, wherein:
said bounding means includes at least one diaphragm for limiting the radiation region at the inside of the conical ring-shaped radiation region;
said diaphragm means has an outer edge; and
a further diaphragm is disposed substantially parallel to the first-mentioned diaphragm for screening the radiation receiver from the radiation scattering effects of said outer edge.

8. The smoke detector as defined in claim 1, wherein:
said radiation receiver contains a radiation receiving surface; and
said web means containing upper edges are arranged rearwardly of the plane containing the radiation receiving surface of the radiation receiver.

9. The smoke detector as defined in claim 1, wherein:
said bounding means include means delimiting the conical ring-shaped radiation region; and
said delimiting means are arranged totally outside of the radiation receiving region of the radiation receiver in order to suppress the reception of radiation scattered at said delimiting means from reaching the radiation receiver.

* * * * *